United States Patent [19]

Jallouli et al.

[11] Patent Number: 5,696,219
[45] Date of Patent: Dec. 9, 1997

[54] SILYL ESTER INITIATORS FOR CYCLOSILOXANE RING OPENING POLYMERIZATION

[75] Inventors: Aref Jallouli; John Carlton Saam, both of Midland, Mich.

[73] Assignee: Dow Corning Corporation, Midland, Mich.

[21] Appl. No.: 784,589

[22] Filed: Jan. 21, 1997

[51] Int. Cl.$^6$ .................................................. C08G 77/08
[52] U.S. Cl. ............................. 528/21; 528/23; 528/42
[58] Field of Search .............................. 528/21, 23, 42

[56] References Cited

U.S. PATENT DOCUMENTS

| | | | |
|---|---|---|---|
| 3,122,521 | 2/1964 | Pierce | 260/46.5 |
| 3,373,138 | 3/1968 | Brown | 260/46.5 |
| 3,974,120 | 8/1976 | Razzano et al. | 528/23 |
| 4,341,888 | 7/1982 | Razzano | 528/14 |
| 4,814,418 | 3/1989 | Miyake et al. | 528/37 |
| 5,145,934 | 9/1992 | Kobayashi et al. | 528/23 |
| 5,241,032 | 8/1993 | Kobayashi et al. | 528/23 |
| 5,401,822 | 3/1995 | Collins | 528/18 |

OTHER PUBLICATIONS

Journal of Polymer Science: Part A: Polymer Chemistry, vol. 33, 285–298, (1995).
Macromol. Chem. Phys., 196, 2715–2735, (1995).

*Primary Examiner*—Margaret W. Glass
*Attorney, Agent, or Firm*—James L. Decesare

[57] ABSTRACT

Method of making polysiloxanes by ring opening polymerization of 1,3,5-trimethyl-1,3,5-tris(3',3',3'-trifluoropropyl) cyclotrisiloxane ($F_3$) or 1,3,5,7-tetramethyl-1,3,5,7-tetrakis (3',3',3'-trifluoropropyl) cyclotetrasiloxane ($F_4$) in an acid-free system using electrophillic initiators. The reaction mixture is formed under anhydrous conditions and contains (i) either $F_3$ or $F_4$, (ii) a Lewis base such as 2,6-di-tert-butylpyridine which serves as an acid scavenger, and optionally (iii) a salt of a strong acid such as tetrabutylammonium trifluoromethane sulfonate. The anhydrous mixture is contacted with a silyl ester of a strong acid such as triflic acid. The anhydrous reaction mixture is agitated at room temperature until a polysiloxane is formed.

11 Claims, No Drawings

SILYL ESTER INITIATORS FOR CYCLOSILOXANE RING OPENING POLYMERIZATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to methods of making polymers by ring opening polymerization, and more particularly to methods of making polysiloxanes by ring opening polymerization of cyclosiloxanes.

Krzysztof Matyjaszewski et al in the Journal of Polymer Science: Part A: Polymer Chemistry, Volume 33, Pages 285–298, (1995) have reported that trimethylsilyl trifluoromethane sulfonate, i.e., trimethylsilyl triflate, in the presence of promoters such as acetone, initiates ring opening polymerization of heterocyclic compounds such as tetrahydrofuran or 2-methyl-2-oxazoline, but cyclosiloxanes were not considered. In the Matyjaszewski et al polymerizations, carbon-oxygen or carbon-nitrogen bonds break and reform. These types of bonds are significantly different from silicon-oxygen bonds in their behavior.

Furthermore, Pierre Sigwalt et al in Macromol. Chem. Phys., 196, No. 9, Pages 2715–2735, (September 1995), show that trimethylsilyl triflate in the presence of a proton trap, is not an initiator for the ring opening polymerization of 1,3,5-trimethylcyclotrisiloxane, i.e., hexamethylcyclotrisiloxane ($D_3$) shown below:

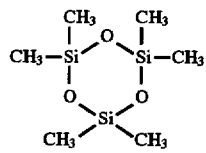

Pierre Sigwalt et al also show that polymerization proceeds only when free trifluoromethane sulfonic acid, i.e., $CF_3SO_3H$ (triflic acid), the true catalyst, is present with trimethylsilyl triflate. The Pierre Sigwalt et al citation does not relate to the polymerization of fluoroalkyl functional cyclosiloxanes, nor does it mention optionally using soluble salts, promoters, or co-catalysts in combination with trimethylsilyl triflate in an acid-free system.

BRIEF SUMMARY OF THE INVENTION

Our invention relates to a method of making polysiloxanes from fluoroalkyl functional cyclosiloxanes by ring opening polymerization in an acid-free system. The method comprises the steps of (A) forming a mixture, preferably under anhydrous conditions, containing (i) a cyclosiloxane of the formula $(RR'SiO)_x$ where R is an alkyl radical with 1–8 carbon atoms, R' is a fluoroalkyl radical of 3–8 carbon atoms, and x is 3–6; (ii) a Lewis base; and optionally (iii) a salt of a strong acid;

(B) contacting the mixture with a silyl ester of the strong acid; and (C) agitating the mixture and the silyl ester at room temperature to form the polysiloxane.

These and other features and objects of our invention will become apparent from a consideration of the detailed description.

BRIEF DESCRIPTION OF THE SEVERAL VIEWS OF THE DRAWING

Not applicable.

DETAILED DESCRIPTION OF THE INVENTION

We have found that silyl esters of strong acids, such as trimethylsilyl trifluoromethane sulfonate, shown below

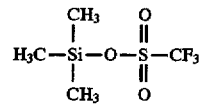

(which can optionally be combined with certain soluble salts such as tetrabutylammonium trifluoromethane sulfonate $(CF_3SO_3)N[(CH_2)_3CH_3]_4$, i.e., tetrabutylammonium triflate) are effective initiators for the ring opening polymerization of fluoroalkyl functional cyclosiloxanes.

The polymerizations are conducted preferably under anhydrous conditions, in the presence of a Lewis base such as 2,6-di-tert-butylpyridine shown below, which acts as a proton trap, so that there is no adventitious initiation by free triflic acid accidentally introduced to the system.

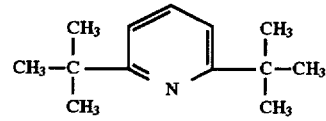

The polymerization can be conducted at room temperature, i.e. about 20°–25° C./68°–77° F., in solution or bulk. We have demonstrated in examples which follow, that with our initiator system, good yields of polymer product can be obtained from 1,3,5-trimethyl-1,3,5-tris(3',3',3'-trifluoropropyl) cyclotrisiloxane shown below

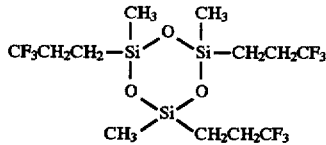

Only small amounts of by-produced cyclosiloxanes are present in the reaction product. A comparative example shows that 2,6-di-t-butylpyridine trifluoromethane sulfonate, i.e., 2,6-di-t-butylpyridine triflate, the salt formed if triflic acid were accidentally introduced during the process, is an ineffective initiator for siloxane ring opening polymerization.

The first step in performing our method of making polysiloxanes from fluoroalkyl functional cyclosiloxanes by ring opening polymerization, is to form a mixture, preferably under anhydrous conditions, containing a cyclosiloxane of the formula $(RR'SiO)_x$, where R is an alkyl radical with 1–8 carbon atoms, x is 3–6, and R' is a fluoroalkyl radical of 3–8 carbon atoms. Suitable R groups are methyl, ethyl, propyl, isopropyl, butyl, isobutyl, pentyl, hexyl, heptyl, and octyl. Suitable R' groups are $CF_3CH_2CH_2-$, $C_2F_5CH_2CH_2-$, $C_3F_7CH_2CH_2-$, and $C_7F_{15}CH_2CH_2-$. Preferably, R is methyl and R' is $CF_3CH_2CH_2-$. The preferred cyclosiloxanes according to our invention are 1,3,5-trimethyl-1,3,5-tris(3',3',3'-trifluoropropyl) cyclotrisiloxane and 1,3,5,7-tetramethyl-1,3,5,7-tetrakis(3',3',3'-trifluoropropyl) cyclotetrasiloxane.

To the cyclosiloxane is added a Lewis base. Some examples of appropriate Lewis bases that can be employed are tertiary amines such as triethylamine, tri-n-butylamine, and phenyldimethylamine; pyridine; and pyridine derivatives such as 2,6-dimethylpyridine, 2-methylpyridine, 2,4,6-trimethylpyridine, 2,4-dimethylpyridine, and 2,6-di-tert-butylpyridine. The preferred Lewis base according to our invention is 2,6-di-tert-butylpyridine.

An optional ingredient that can be added to the cyclosiloxane and the Lewis base, is a salt of a strong acid. By "strong acid" is meant any acid defined as being a super acid or any acid which is ten times stronger than sulfuric acid, such as perfluoroalkane sulfonic acids. The most preferred strong acid is trifluoromethane sulfonic acid $CF_3SO_3H$, although other perfluoroalkane sulfonic acids such as $C_2F_5SO_3H$, $C_4F_9SO_3H$, $C_5F_{11}SO_3H$, $C_6F_{13}SO_3H$, and $C_8F_{17}SO_3H$ can be employed.

Tetraalkylammonium salts of these perfluoroalkane sulfonic acids are most preferred such as tetraethylammonium trifluoromethane sulfonate or tetrabutylammonium trifluoromethane sulfonate. The most preferred optional promoter or co-catalyst for our ring opening polymerization method is tetrabutylammonium trifluoromethane sulfonate.

The initiator for the ring opening polymerization method according to our invention is a silyl ester of the strong acid referred to above. Suitable silyl esters generally conform to the formula:

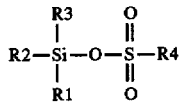

where R1, R2, and R3 are alkyl or fluoroalkyl radicals containing 1–6 carbon atoms, such as methyl, ethyl, propyl, isopropyl, 3,3,3-trifluoropropyl, butyl, isobutyl, pentyl, and hexyl, most preferably methyl or 3,3,3-trifluoropropyl; and R4 is a perfluoroalkyl group, such as $-CF_3$, $-C_2F_5$, $-C_4F_9$, $-C_5F_{11}$, $-C_6F_{13}$, or $-C_8F_{17}$, most preferably the $-CF_3$ group.

It is preferred to conduct the process of our invention at room temperature, i.e., 20°–25° C., but the process can be carried out at a temperature from the freezing point of the reaction mixture to the volatilization point of the silyl ester, which is preferably from room temperature to about 120° C.

The process can be carried out in the presence of a solvent, however, the solvent must be one with no active protons which might interfere with growing polymerization centers. One suitable solvent, for example, is methylene chloride. Equivalent amounts of reactants should be employed in the process, although it may be necessary to use an excess of one or more of the reactants. The maximum amount is determined, for example, by economical considerations, as there is no benefit in employing an excess of a reactant that is not consumed. The minimum amount will depend on the type and purity of the reactants.

The following examples are set forth for the purpose of illustrating our invention in more detail. The cyclosiloxane used in these examples was the compound 1,3,5-trimethyl-1,3,5-tris(3',3',3'-trifluoropropyl) cyclotrisiloxane, and it contained 23% of the cis isomer and 77% of the trans isomer according to $^{13}C$ Nuclear Magnetic Resonance (NMR). The compound 2,6-di-tert-butylpyridine $8.24 \times 10^{-2}M$ in methylene chloride (as a diluent) was dried over calcium hydride and filtered prior to its use. Methylene chloride was also dried over calcium hydride and filtered prior to its use. Opened ampoules of trimethylsilyl triflate were kept in a moisture-free environment.

Prior to use, all glassware including syringes and pipettes that would contact the reagents and catalysts, were baked at 100° C. under vacuum, cooled, and stored while being protected from moisture. Polymer yields were estimated from the area percent of polymer fraction noted in Gel Permeation Chromatograms (GPC), and the area percent was corrected for difference in refractive indices between the polymer obtained and any cyclosiloxanes present in the product.

EXAMPLE I

The polymerization of $F_3$

A 50 ml three necked flask equipped with a magnetic stirrer, a rubber septum on one port, an inlet for an inert gas on another port, and a rubber balloon on the third port, was flamed under vacuum, and then filled with dry argon, so that the balloon would just fill and slightly expand. The freshly dried and filtered $F_3$, 4.0 ml (10.6 mmol), was injected through the septum, followed by 1.4 ml (0.115 mmol) of the freshly dried and filtered 2,6-di-tert-butylpyridine solution. The mixture at this point contained 25.8% of methylene chloride which was introduced with the 2,6-di-tert-butylpyridine solution. Then 20 μl (0.103 mmol) of trimethylsilyl triflate was injected with stirring at room temperature (23°–25° C.). Stirring was continued at room temperature for 24 hours after which there had been a substantial increase in viscosity. The polymerization was terminated by stirring for one hour with an excess of sodium bicarbonate over the trimethylsilyl triflate. The mixture was washed several times with water and dried in a vacuum to remove residual solvent and water, to provide 4.97 g of a non-volatile product (99.8%). Analysis by GPC indicated that the product was composed of 81.3% polymer having a number average molecular weight ($M_n$) of 28,100, and a polydispersity ($M_w/M_n$) of 2.2. The remaining 18.7% of the product was a mixture of oligomeric siloxanes composed mainly of $F_4$–$F_6$.

EXAMPLE II

Comparative

When the same procedure in Example I was followed, but with trimethylsilyl triflate replaced with 0.4 ml of triflic acid solution in dry methylene chloride (0.068 mmol), added to 4.0 ml (10.6 mmol) of freshly dried and filtered F3, and 1.0 ml (0.082 mmol) of freshly dried and filtered 2,6-di-tert-butylpyridine solution, only 9.1 weight percent of polymer ($M_n$ 9,800, $M_w/M_n$ 3.7) formed after 164 hours of reaction. The balance of this product was a mixture of cyclosiloxanes composed of 78% $F_6$ and 22% $F_4+F_5$. This comparative example shows that 2,6-di-tert-butylpyridine is an effective proton trap, and that the results obtained according to the method of our invention in Example I could not have been not caused by an accidental catalysis with triflic acid.

Other variations may be made in compounds, compositions, and methods described herein without departing from the essential features of our invention. The forms of invention are exemplary only and not intended as limitations on its scope as defined in the appended claims.

We claim:

1. A method of making polysiloxanes from fluoroalkyl functional cyclosiloxanes by ring opening polymerization in an acid-free system comprising the steps of
   (A) forming a mixture under anhydrous conditions containing (i) a cyclosiloxane of the formula $(RR'SiO)_x$ where R is an alkyl radical with 1–8 carbon atoms, R' is a fluoroalkyl radical of 3–8 carbon atoms, and x is 3–6; (ii) a Lewis base; and optionally (iii) tetrabutylammonium triflouormethane sulfonate;
   (B) contacting the mixture under anhydrous conditions with a silyl ester of the strong acid; and
   (C) agitating the mixture and the silyl ester to form a polysiloxane.

2. A method according to claim 1 in which the cyclosiloxane is 1,3,5-trimethyl-1,3,5-tris(3',[@0003]',3'-trifluoropropyl) cyclotrisiloxane or 1,3,5,7-tetramethyl-1,3,5,7-tetrakis(3',3',3'-trifluoropropyl) cyclotetrasiloxane.

3. A method according to claim 1 in which the Lewis base is a compound selected from the group consisting of triethylamine, tri-n-butylamine, phenyldimethylamine, pyridine, 2,6-dimethylpyridine, 2-methylpyridine, 2,4,6-trimethylpyridine, 2,4-dimethylpyridine, and 2,6-di-tert-butylpyridine.

4. A method according to claim 3 in which the Lewis base is 2,6-di-tert-butylpyridine.

5. A method according to claim 1 in which the strong acid is trifluoromethane sulfonic acid.

6. A method according to claim 1 in which the silyl ester of the strong acid is a compound having the formula

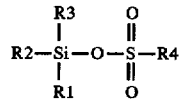

where R1, R2, and R3 are alkyl or fluoroalkyl radicals containing 1–6 carbon atoms, and R4 is a perfluoroalkyl group.

7. A method according to claim 6 in which the silyl ester of the strong acid is trimethylsilyl trifluoromethane sulfonate.

8. A method according to claim 1 in which step (C) is carried out at room temperature.

9. A method of making polysiloxanes by ring opening polymerization of a fluoroalkyl functional cyclosiloxane in an acid-free system comprising the steps of
   (A) forming a mixture under anhydrous conditions containing (i) 1,3 5-trimethyl-1,3,5-tris(3',3',3'-trifluoropropyl) cyclotrisiloxane; (ii) 2,6-di-tert-butylpyridine; and optionally (iii) tetrabutylammonium trifluoromethane sulfonate;
   (B) contacting the mixture under anhydrous conditions with a silyl ester of a strong acid having the formula

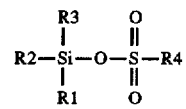

where R1, R2, and R3 are alkyl or fluoroalkyl radicals containing 1–6 carbon atoms, and R4 is a perfluoroalkyl group; and
   (C) agitating the mixture and the silyl ester of a strong acid to form a polysiloxane.

10. A method according to claim 9 in which the silyl ester of the strong acid is trimethylsilyl trifluoromethane sulfonate.

11. A method according to claim 9 in which step (C) is carried out at room temperature.

* * * * *